(12) United States Patent
Wingo et al.

(10) Patent No.: US 10,613,429 B1
(45) Date of Patent: Apr. 7, 2020

(54) UNMANNED AERIAL VEHICLE WITH ATTACHED APPARATUS FOR X-RAY ANALYSIS OF POWER LINES

(71) Applicant: Talon Aerolytics (Holding), Inc., West Point, GA (US)

(72) Inventors: Austin Wingo, Opelika, AL (US); Timothy Dunnigan, Lanett, AL (US); Phillip Bevel, Opelika, AL (US); Eric Hare, Opelika, AL (US); Timothy Dunnigan, Jr., Auburn, AL (US)

(73) Assignee: Talon Aerolytics (Holding), Inc., West Point, GA (US)

(*) Notice: Subject to any disclaimer, the term of this patent is extended or adjusted under 35 U.S.C. 154(b) by 86 days.

(21) Appl. No.: 15/967,042

(22) Filed: Apr. 30, 2018

Related U.S. Application Data

(60) Provisional application No. 62/551,573, filed on Aug. 29, 2017.

(51) Int. Cl.
*G03B 42/04* (2006.01)
*G01N 23/00* (2006.01)

(52) U.S. Cl.
CPC ............ *G03B 42/04* (2013.01); *G01N 23/00* (2013.01); *B64C 2201/024* (2013.01); *B64C 2201/123* (2013.01); *G01N 2223/40* (2013.01)

(58) Field of Classification Search
CPC ........ B64C 2201/024; B64C 2201/123; G01N 23/00; G01N 2223/40; G03B 42/04
See application file for complete search history.

(56) References Cited

U.S. PATENT DOCUMENTS

| D181,521 S | 11/1957 | Ensign et al. |
| D298,054 S | 10/1988 | Moore |
| D363,915 S | 11/1995 | Weems |
| D406,892 S | 3/1999 | Warren |
| D679,016 S | 3/2013 | Jarva |
| D685,478 S | 7/2013 | Lomas et al. |
| D692,139 S | 10/2013 | Charles |
| 2006/0114122 A1* | 6/2006 | Jones ................. H02G 1/02 340/870.07 |
| 2012/0262708 A1* | 10/2012 | Connolly ............ B64C 39/024 356/237.2 |
| 2017/0029101 A1* | 2/2017 | Weissenberg ........ B64C 27/006 |
| 2017/0106998 A1* | 4/2017 | Zhou .................... B64D 47/08 |
| 2017/0168107 A1* | 6/2017 | Vinogradova ........... H02G 1/02 |

(Continued)

OTHER PUBLICATIONS

"Power Line X-ray", Photo submitted by inventors; View 1; photograph on or before Aug. 7, 2017.

(Continued)

*Primary Examiner* — Mark R Gaworecki
(74) *Attorney, Agent, or Firm* — Philip H. Burrus, IV

(57) ABSTRACT

A device (200) includes a unit bracket weldment (201), a bridge weldment (202) extending from the unit bracket weldment to a plate bracket assembly (209), and an x-ray plate (203) extending distally from the plate bracket assembly. One or more cable hook weldments (211,212) are disposed to either side of the x-ray plate. A method of inspecting a cable (1102) or power line includes coupling the device to a drone (101). The drone can then be flown to capture the cable in the cable hook weldments such that an x-ray imager (1103) can capture one or more of x-ray images of the cable or power line.

20 Claims, 14 Drawing Sheets

(56) References Cited

U.S. PATENT DOCUMENTS

| | | |
|---|---|---|
| 2017/0285092 A1* | 10/2017 | Moore ............... G01R 31/1218 |
| 2017/0329037 A1* | 11/2017 | Zhou .................... G01V 5/0083 |
| 2017/0336806 A1* | 11/2017 | Blanc-Paques ........ G08G 5/045 |
| 2018/0120196 A1* | 5/2018 | Georgeson .......... G01M 5/0008 |
| 2018/0141656 A1* | 5/2018 | Heinonen ............. B64C 39/024 |
| 2018/0156616 A1* | 6/2018 | Bennett ................ G05D 1/0094 |
| 2019/0260191 A1* | 8/2019 | Lavoie ................... B64C 39/02 |

OTHER PUBLICATIONS

"Power Line X-ray", Photo submitted by inventors; View 2; photograph on or before Aug. 7, 2017.
"Power Line Xray Cage", Photo submitted by inventors; taken on or before Aug. 7, 2017.
Doan, Anhdao , "NonFinal Office Action", U.S. Appl. No. 29/647,381; filed May 11, 2018; dated Jan. 14, 2020.

* cited by examiner

UNMANNED AERIAL VEHICLE WITH ATTACHED APPARATUS FOR X-RAY ANALYSIS OF POWER LINES

CROSS REFERENCE TO PRIOR APPLICATIONS

This application claims priority and benefit under 35 U.S.C. § 119(e) from U.S. Provisional Application No. 62/551,573, filed Aug. 29, 2017, which is incorporated by reference for all purposes.

BACKGROUND

Technical Field

This disclosure relates generally to devices, and more particularly to devices for attachment to an unmanned aerial vehicle.

Background Art

Large land bound structures, such as cellular tower installations, buildings, construction sites, agricultural installations, and other terrestrial assets can be challenging to inspect. Such assets are sometimes too large, too high up, or too tall for a person to visually inspect from the ground. While ladders, cranes, and even helicopters can be used for asset inspection, each presents its own challenges. Ladders are unwieldy and cumbersome to use, while cranes are cumbersome, costly, and unwieldy. Helicopters are just plain expensive. Moreover, using cranes or helicopters near sensitive or dangerous assets can damage the asset, inspector, or both.

Compounding this inspection issue is the fact that the inspector may not know how to—or may not be physically able to—perform an inspection or identify any anomalies. For assets that may be visibly inspected, significant training is often required. This training is expensive and limits the number of personnel who may be qualified to perform inspections. For assets that are not suitable for visible inspection, no amount of training will help. It would be advantageous to have an improved inspection system that made both the inspection and anomaly identification process simpler, less costly, and more efficient.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
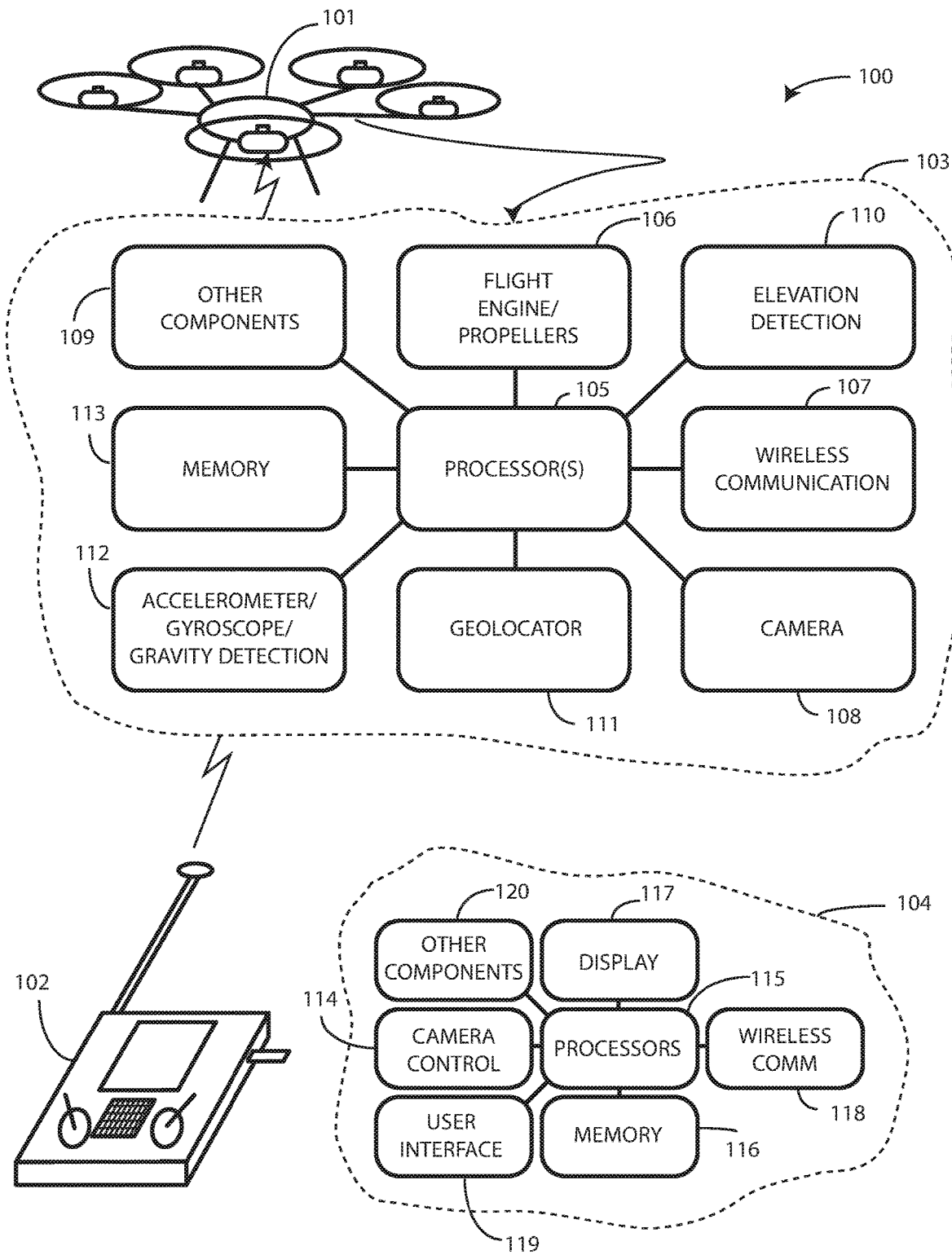
FIG. 1 illustrates one explanatory unmanned aerial vehicle in accordance with one or more embodiments of the disclosure.
Figure 2:
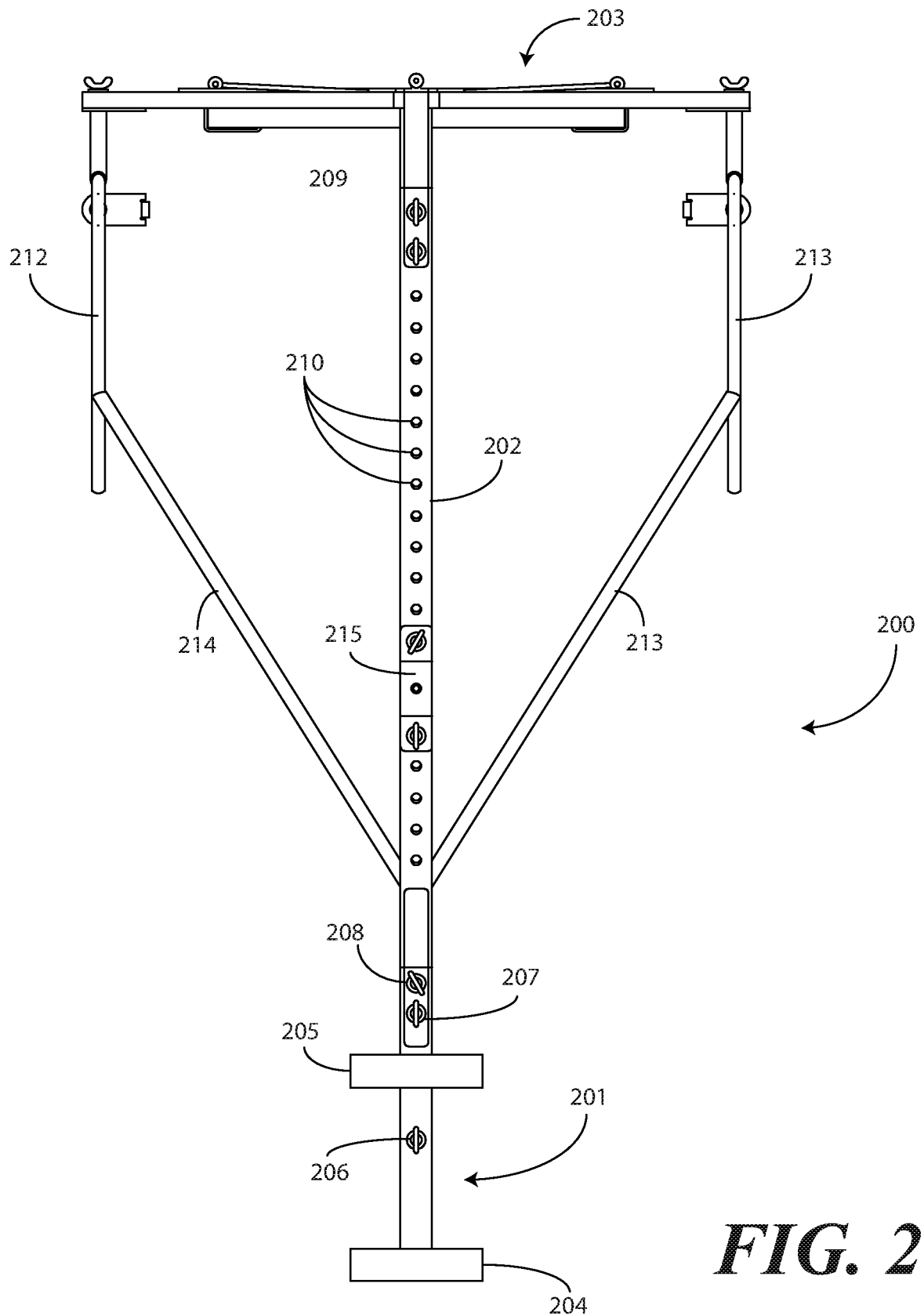
FIG. 2 illustrates a top plan view of one explanatory device in accordance with one or more embodiments of the disclosure.
Figure 3:
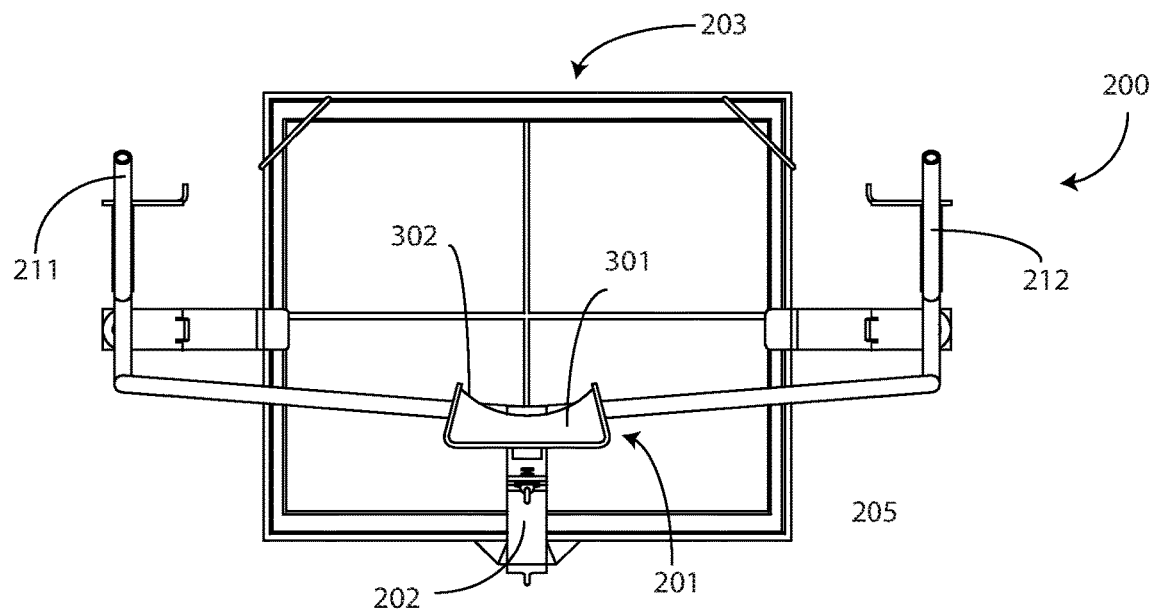
FIG. 3 illustrates a rear elevation of one explanatory device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to obtaining one or more x-ray images of a power line using an unmanned aerial vehicle in accordance with one or more embodiments of the disclosure. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of obtaining x-ray images of power lines using an unmanned aerial vehicle and device as described herein. The non-processor circuits may include, but are not limited to, a radio receiver, a radio transmitter, signal drivers, clock circuits, power source circuits, and user input devices. As such, these functions may be interpreted as steps of a method to perform the steps of obtaining such x-ray images. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a chassis that can be connected to an unmanned aerial vehicle. X-ray images of power lines and other thin, linear objects can be obtained when an x-ray camera is coupled to the chassis.

Embodiments of the present disclosure provide methods, systems, and apparatuses that allow unmanned aircraft, referred to herein as "drones" or "unmanned aerial vehicles," to perform x-ray inspections in a controlled, consistent, and advantageous manner. Such unmanned aircraft comprise vehicles capable of flight and navigation without an onboard, human pilot. General unmanned aircraft, as well as their methods of control by remote pilots or one or more onboard processors, will be obvious to those of ordinary skill in the art having the benefit of this disclosure. Moreover, the selection of commercially available unmanned aircraft and/or design of custom unmanned aircraft suitable for executing the methods described below will be obvious to those of ordinary skill in the art having the benefit of this disclosure.

Embodiments of the disclosure advantageously eliminate the need for workers and technicians to climb a pole or substation structure to obtain x-rays manually, thereby reducing or eliminating the chance of injury or death. Additionally, embodiments of the disclosure provide x-ray inspection techniques that are lower in cost than having a climber or helicopter.

In one or more embodiments, a drone or unmanned aerial vehicle inspects a power line in a predefined manner, collecting x-ray images of the power line. In one or more embodiments, the drone or unmanned aerial vehicle collects detailed information and measurements that can be analyzed and delivered to a customer through a web portal so that system purveyors can review up to date imagery and data of all of their assets with the click of a mouse. Embodiments of the disclosure can advantageously perform x-ray inspections on components that are difficult for a human climber to inspect.

In one embodiment, a method of inspecting a power line comprises deploying an unmanned aircraft. In one embodiment, the method includes capturing, with an x-ray image capture device of the unmanned aircraft, one or more of x-ray video or still images of a power line.

Turning now to FIG. 1, illustrated therein is one explanatory system 100 in accordance with one or more embodiments of the disclosure. In this illustrative embodiment, the system 100 includes a drone 101 and a control device 102. An illustrative schematic block diagram of each of the drone 101 and the control device 102 is also provided. In FIG. 1, schematic block diagram 103 corresponds to the drone 101, while schematic block diagram 104 corresponds to the control device 102.

It is to be understood that FIG. 1 is provided for illustrative purposes only and for illustrating components of one explanatory drone 101 and one explanatory control device 102 configured in accordance with one or more embodiments of the disclosure. Accordingly, schematic block diagram 103 and schematic block diagram 104 are not intended to be complete schematic diagrams of the various components required for either the drone 101 or the control device 102. Other drones or control devices configured in accordance with embodiments of the disclosure may include various other components not shown in FIG. 1, or may include a combination of two or more components or a division of a particular component into two or more separate components, and still be within the scope of the present disclosure.

In one or more embodiments, the drone 101 includes one or more processors 105. The one or more processors 105 are operable with the other components of the drone 101, e.g., the propulsion system 106 and any corresponding navigation system or guidance system, the wireless communication circuit 107, the on-board image capture device 108, the various sensors, or other components 109. Examples of sensors include an elevation detector 110, a geolocation detector 111, and one or more orientation sensors 112. Additional sensors can be included as well, such as laser, infrared, ultrasonic, or other types of measuring devices, internal measurement units, heat sensors, smoke detectors, barometers, and so forth. Batteries or other energy storage devices can also be included to power the various components shown in the schematic block diagram 103 as well.

The one or more processors 105 can include a microprocessor, a group of processing components, one or more ASICs, programmable logic, or other type of processing device. The one or more processors 105 can be configured to process and execute executable software code to perform the various functions of the drone 101. A storage device, such as memory 113, can optionally store the executable software code used by the one or more processors 105 during drone operation. The memory 113 may include either or both static and dynamic memory components, may be used for storing both embedded code and user data. The software code can embody program instructions and methods to operate the various functions of the drone 101, and also to execute software or firmware applications and modules. The one or more processors 105 can execute this software or firmware, and/or interact with modules, to provide drone functionality.

The one or more processors 105 can be operable with a wireless communication circuit 107 that communicates with the control device 102. The wireless communication circuit 107 may use any of a number of wireless technologies for communication, such as, but are not limited to, peer-to-peer or ad hoc communications, frequency modulated communication, amplitude modulated communication, or IEEE 802.11 communication. Other forms of wireless communication will be obvious to those having the benefit of this disclosure. The wireless communication circuit 107 can include wireless communication circuitry, one of a receiver, a transmitter, or transceiver, and one or more antennas.

The propulsion system 106 can include one or more rotary wings. In one embodiment, the propulsion system 106 comprises multiple rotary wings. For example, the propulsion system 106 can include four, six, or eight or more rotors configured as propellers. These propellers can be movable between a generally downward oriented direction to directions tilting forward, aft, and side-to-side so as to move the drone 101 up and down and side to side as desired. A user can employ the control device 102 to control the propulsion system to move the drone 101 as desired in one or more embodiments. In other embodiments, one or more firmware modules can be stored in the memory 113 so that the drone 101 can perform flight operations and can fly flight patterns autonomously. Of course, a combination of user driven control through the control device 102 and autonomous flight action can also be implemented.

In one or more embodiments, the propulsion system 106 can include an energy storage device that propels the rotary wings or propellers. Each propeller can be a two, three, four, or more bladed assembly. Increasing propeller blades decreases noise and increases thrust, while decreasing propeller blades increases efficiency. The exact number of blades or propellers can be selected based upon design, geographic location, typical wind and weather conditions, and so forth. A flight engine operable with the propellers can adjust and change the speeds of each motor driving each propeller to control the speed, direction, and motion of the drone 101.

An image capture device 108 can be configured to capture one or more still or video images in one or more embodiments. In one embodiment, the image capture device 108 can capture still or video images on a continual basis while the drone 101 is in operation. In another embodiments, the image capture device 108 can capture the still or video images automatically in response to sensed external stimuli, e.g., an object resembling the shape of a RAD coming into its line of sight. In yet another embodiment, the image capture device 108 can capture still or video images in response to an image capture control 114 user interface disposed on the control device 102.

The drone 101 can also include one or more orientation sensors 112, such as one or more accelerometers, gyroscopes, gravity detectors, or other devices that can determine the azimuth, plumb, and tilt of the drone 101 itself when in operation. For example, an accelerometer may be used to show vertical orientation, constant tilt and/or whether the drone 101 is stationary or in motion. A gyroscope can be used in a similar fashion. In addition to, or instead of, an accelerometer and/or gyroscope, an electronic compass can be included to detect the spatial orientation of the drone 101 relative to the earth's magnetic field.

The one or more orientation sensors 112 can be used to determine the spatial orientation of the drone 101 when in operation. In one embodiment, the one or more orientation sensors 112 make such determinations by detecting a gravitational direction. This can determine, for example, whether the image capture device 108 is oriented parallel with a reference line that is oriented substantially orthogonally with the vector defining the direction of gravity, above this reference line, or below this reference line.

A geolocation detector 111 can determine a latitude and longitude coordinate location for the drone 101. In one embodiment, geolocation detector 111 comprises a Global Positioning System (GPS) device that determines latitudinal and longitudinal coordinates from a constellation of one or more earth orbiting satellites or from a network of terrestrial base stations. Other systems can be used in place of the GPS system, such as the Global Orbiting Navigation System (GLONASS) or other satellite positioning systems. The geolocation detector 11 may also be able to determine location of the drone 101 by locating or triangulating terrestrial base stations of a traditional cellular network or from other local area networks.

An elevation detector 110, such as an altimeter, can be included to determine an altitude of the drone 101 while in operation. Other components 109 could be included as well. These other components 109 can include light sensors, magnetometers, laser measuring devices to determine the distance between the drone 101 and a power line, an audio capture device to receive acoustic input, and so forth. The other components 109 can include input and output components, such as power inputs and outputs and/or mechanical inputs and outputs. Still other components will be obvious to those of ordinary skill in the art having the benefit of this disclosure. The explanatory drone 101 of FIG. 1 is illustrative only. Numerous other configurations will be obvious to those of ordinary skill in the art having the benefit of this disclosure.

The control device 102 is operable to allow an operator to control the flight of, and optionally the capture of data by, the drone 101. The control device 102 can include one or more processors 115 that are operable with a memory 116. The control device 102 can include a display 117, with which an operator can see still and video images as they are captured by the image capture device 108 of the drone 101.

The control device 102 can send and receive electronic control signals to the drone 101 through a wireless communication circuit 118. The operator can control the drone 101 through a user interface 119, which can include one or more joysticks, knobs, slider controls, rocker controls, touch screens, touch pads, or other devices. Other components 120, such as audio capture devices and audio output devices, can be included as well.

In one or more embodiments, the operator views images captured by the image capture device 108 of the drone 101 on the display 117 to assist in navigating the drone 101 around a tower, around power lines in accordance with embodiments of the disclosure. The display 117 allows the operator to visually see the environment, as well as any obstacles, power lines, mechanical support wires, and so forth, in real time. In other embodiments, the drone 101 is equipped with autonomous navigation that performs these operations, including never flying under wires, automatically. Where autonomous navigation is included, onboard instrumentation, e.g., the geolocation detector 111, image capture device 108, and/or orientation sensors 112, disposed within the drone 101 automatically recognizes as any obstacles, power lines, mechanical support wires, and so forth, so that they can be avoided.

In one or more embodiments, one or more predefined flight patterns can be stored in either the memory 116 of the control device 102 or the memory 113 of the drone 101. These predefined flight patterns can direct the drone 101 to execute a flight pattern through a predefined set of inspection points during a power line inspection.

In one or more embodiments, either the memory 116 of the control device 102 or the memory 113 of the drone 101 can store one or more inspection programs that are used to ensure that the drone 101 captures a predefined set of still and video images during a power line inspection. The one or more inspection programs can also include technical requirements for each x-ray still or video image to ensure that the same are properly captured. Similarly, a power line wire inspection may require a minimum of three still images of the power line wire, but may request less than a maximum of eight still images of the power line wire. Still other requirements will be described below with reference to subsequent figures. Still others will be obvious to those of ordinary skill in the art having the benefit of this disclosure.

Turning now to FIGS. 2-10, illustrated therein is one explanatory device 200 that can be coupled to the drone (101) of FIG. 1. In one or more embodiments, the device 200 comprises an x-ray survey chassis and can be used to capture x-ray images of items such as power lines, tree branches, trusses, support cables, and other thin objects. Other uses for the device 200 will be obvious to those of ordinary skill in the art having the benefit of this disclosure.

The device 200 can be manufactured from metal in one or more embodiments. In other embodiments, the device 200 can be manufactured from plastic. Additionally, some components can be manufactured from a first material, such as metal, while other components can be manufactured from a different material, such as plastic. Other materials suitable for manufacturing the device 200 will be obvious to those of ordinary skill in the art having the benefit of this disclosure.

The device 200 includes several components. Generally speaking, the components include a unit bracket weldment 201, a bridge weldment 202, and an x-ray plate 203. In one or more embodiments, the unit bracket weldment 201 couples to an x-ray imager. The x-ray imager shoots photons toward the x-ray plate 203, which carries a film that is excited by x-rays in one or more embodiments. When objects, such as power lines or other assets are disposed between the x-ray imager and the x-ray plate 203, x-ray images of the asset can be captured on the film carried by the x-ray plate 203.

The unit bracket weldment 201 can be configured to couple to various types of x-ray imagers. In one or more embodiments, the unit bracket weldment 201 comprises a first bracket 204 and a second bracket 205. In one embodiment, the first bracket 204 is separated from the second bracket 205 by a distance of about six inches. In one or more embodiments, the unit bracket weldment 201 is manufactured from aluminum.

In one or more embodiments, each of the first bracket 204 and the second bracket 205 comprise substantially flat base members 601,602 with arm extensions 603,604,605,606 extending from the substantially flat base members 601,602 at acute angles. In one or more embodiments, the substantially flat base members 601,602 are between four and five inches in length. In one embodiment, the substantially flat base members 601,602 are about 4.130 inches in length.

In one or more embodiments, the substantially flat base members 601,602 are between one and two inches in width. Illustrating by example, in one embodiment, the substantially flat base members 601,602 are about 1.5 inches in width.

In one or more embodiments, the arm extensions 603,604,605,606 extend from the substantially flat base members 601,602 at an angle of between 60 and 90 degrees. In one embodiment, the arm extensions 603,604,605,606 extend from the substantially flat base members 601,602 at an angle of about 76 degrees.

In one or more embodiments, the first bracket 204 comprises a base plate 301 against which an x-ray imager may rest when coupled to the unit bracket weldment 201. In one or more embodiments, the base plate 301 terminates at a radius 302, opposite the substantially flat base member 601 of the first bracket 204. In one embodiment, the radius 302 has a radius length of between two and three inches. In one embodiment, the radius length is about 2.453 inches.

In one or more embodiments, the unit bracket weldment 201 includes an aperture 501 through which a fastener can be inserted to retain an x-ray imager to the unit bracket weldment 201 with a coupler 206, such as a wing nut. In one or more embodiments, the unit bracket weldment 201 is coupled to the bridge weldment 202 with one or more fasteners 207,208, which in this case are threaded screws and wing nuts.

The bridge weldment 202 then extends from the unit bracket weldment 201 to a plate bracket assembly 503. Specifically, a first end of the bridge weldment 202 is coupled to the unit bracket weldment 201, while a second, distal end of the bridge weldment 202 is coupled to the x-ray plate 203.

In one or more embodiments, the bridge weldment 202 comprises a rectangular section of aluminum with a depth of about 1 inch and a thickness of about one half inch. In one or more embodiments, the bridge weldment 202 is between twenty-four and twenty-five inches in length. In one embodiment, the bridge weldment 202 is about 24.860 inches in length.

In one or more embodiments, the bridge weldment 202 defines a plurality of apertures 210 along its length. In one embodiment, these apertures 210 have a diameter of about 0.28 inches, and are drilled at one-inch centers.

In one or more embodiments, a plate bracket assembly 209 couples the x-ray plate 203 to the bridge weldment 202. The plate bracket assembly 209. In one embodiment comprises an aluminum strip having a first portion, which is coupled to the bridge weldment 202, and a second portion that is coupled to the x-ray plate 203. In one embodiment, there is an angle between the first portion and the second portion. This angle can be seen in FIGS. 9 and 10. In one or more embodiments, the angle is between 170 and 180 degrees. For example, in one or more embodiments the angle is about 173 degrees. The plate bracket assembly 209 can be manufactured from aluminum in one or more embodiments.

Figure 4:
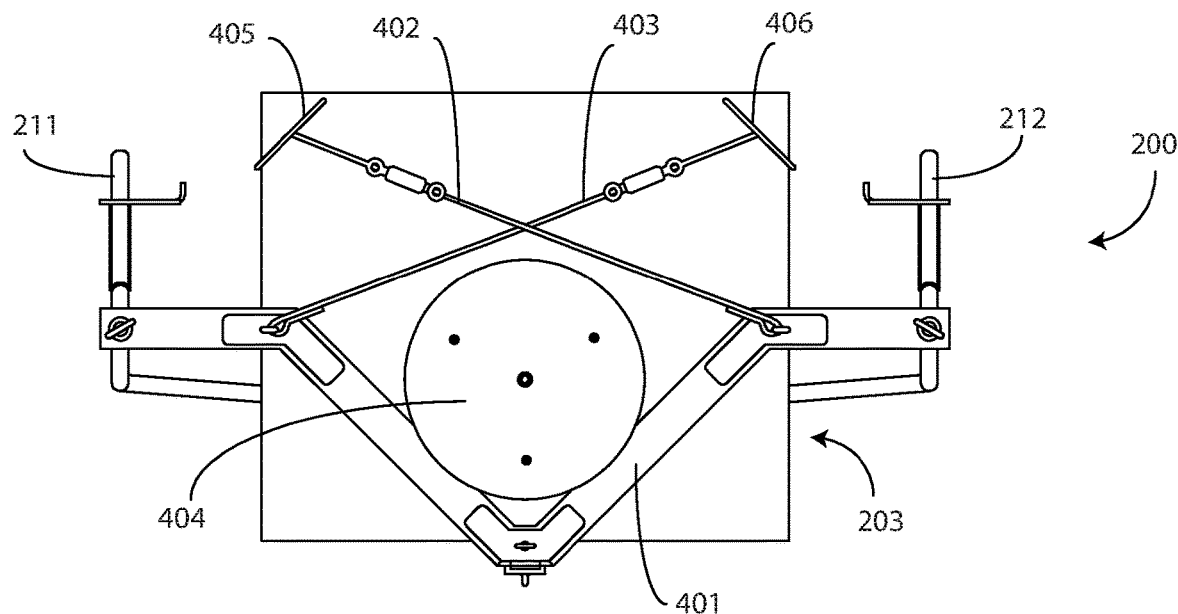
FIG. 4 illustrates a front elevation view of one explanatory device in accordance with one or more embodiments of the disclosure.
Figure 5:
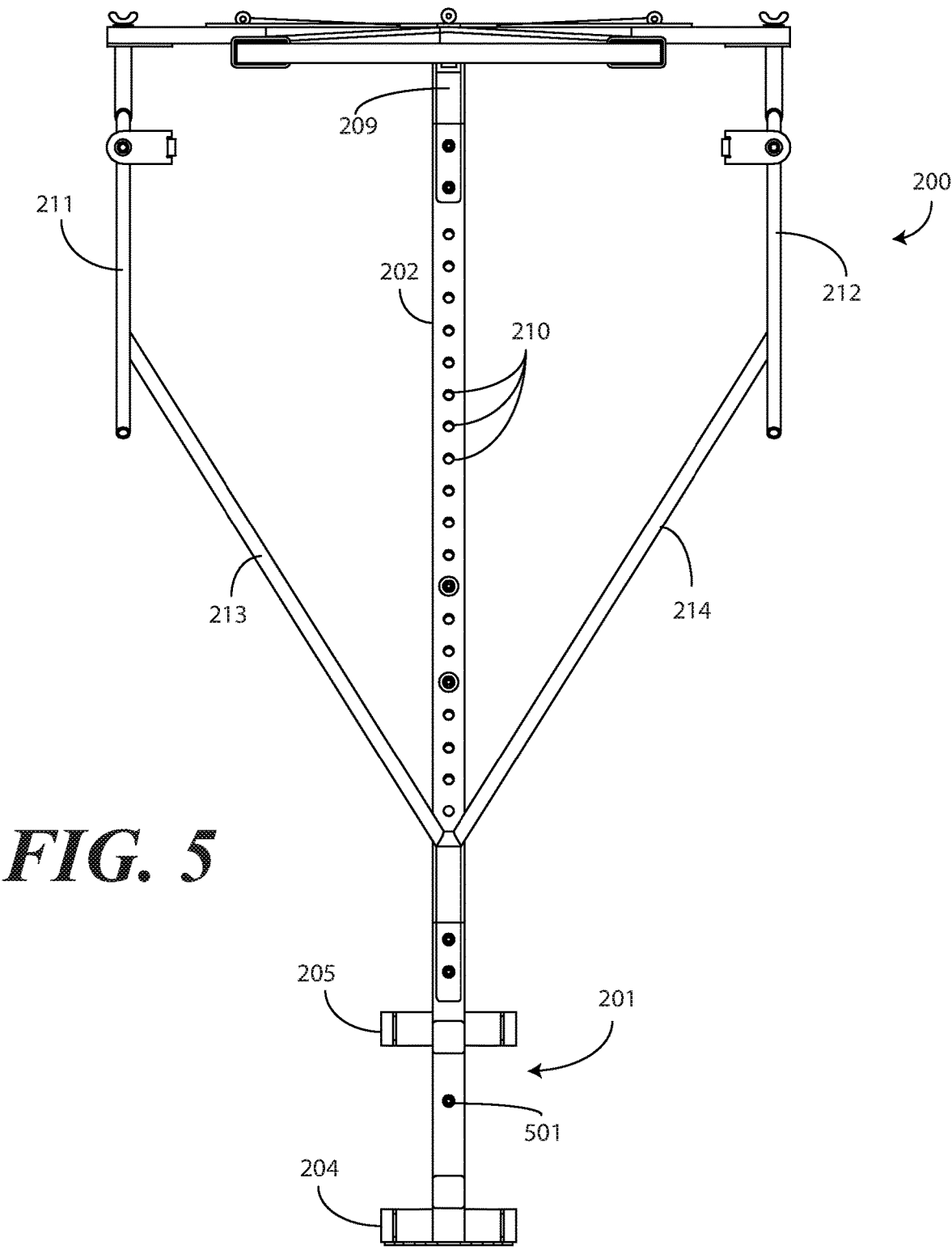
FIG. 5 illustrates a bottom plan view of one explanatory device in accordance with one or more embodiments of the disclosure.

In one or more embodiments, a plate bracket weldment 401 couples the plate bracket assembly 209 to the x-ray plate 203. As best shown in FIG. 4, in one or more embodiments the plate bracket weldment 401 comprises a V-shaped section of aluminum having horizontal extension members extending from the top of the V-shape.

In one or more embodiments, the plate bracket assembly 209 and the plate bracket weldment 401 couple the x-ray plate 203 to the bridge weldment 202 such that the x-ray plate 203 extends distally therefrom at an angle that is substantially orthogonal with the bridge weldment. When a film is coupled to and carried by the x-ray plate 203, this film can capture digital x-ray imagery when stimulated by the x-ray imager.

Disposed at either side of the x-ray plate 203 are cable hook weldments 211,212. In one or more embodiments, the cable hook weldments 211,212 are coupled to the plate bracket assembly 209 at a first end, and then are coupled via suspension arms 213,214 to the bridge weldment 202.

Figure 9:
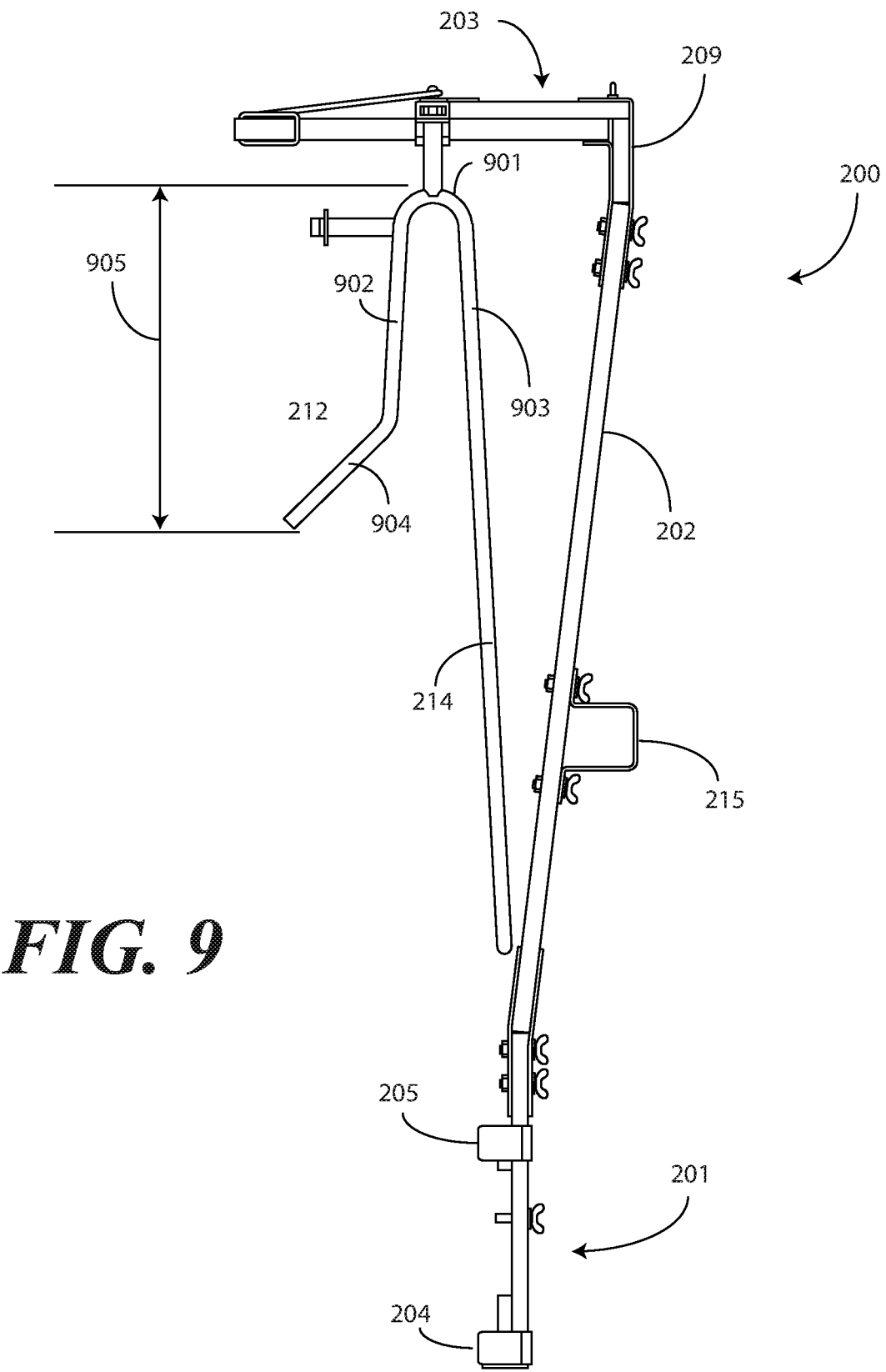
FIG. 9 illustrates a left elevation view of one explanatory device in accordance with one or more embodiments of the disclosure.
Figure 10:
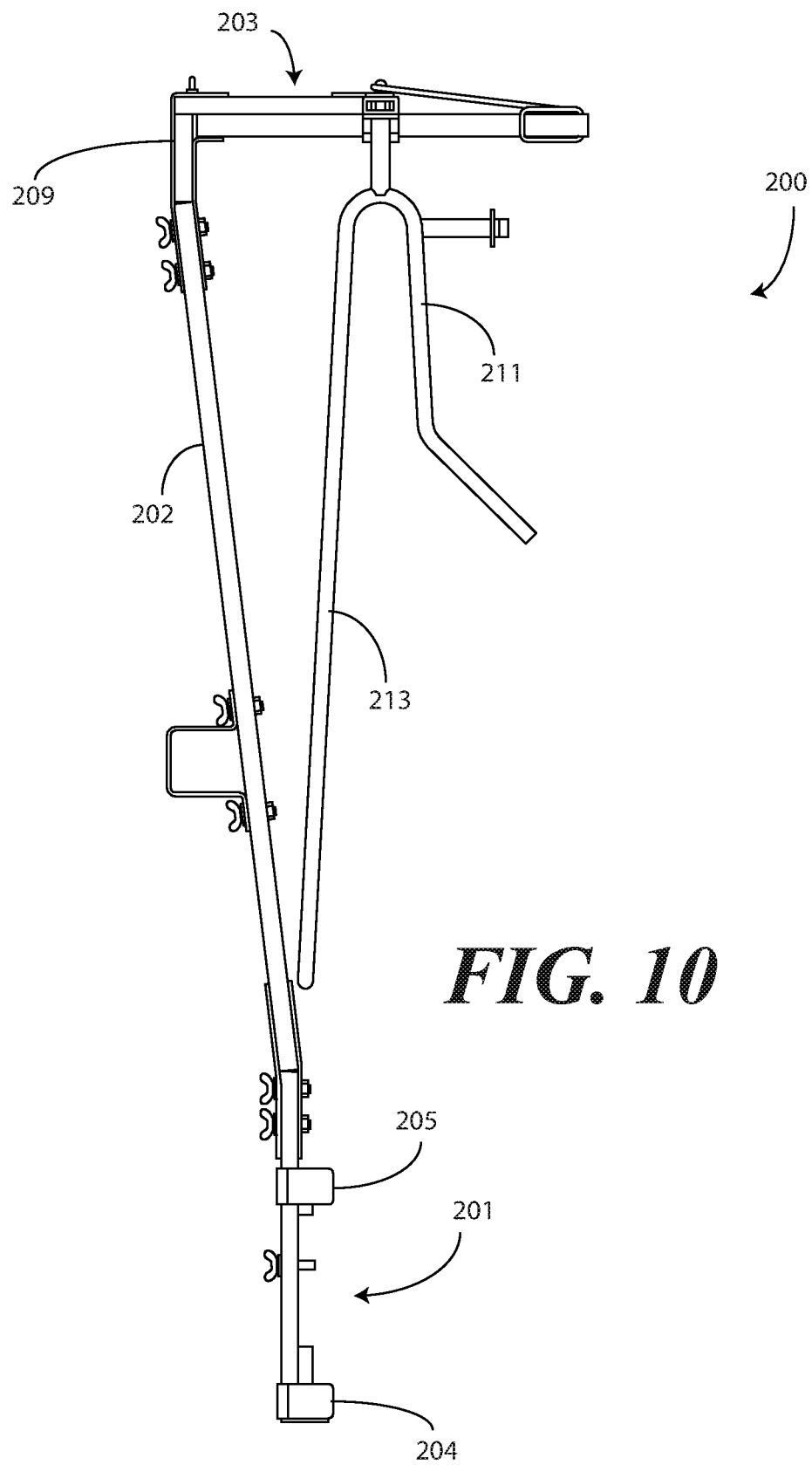
FIG. 10 illustrates a right elevation view of one explanatory device in accordance with one or more embodiments of the disclosure.
Figure 11:
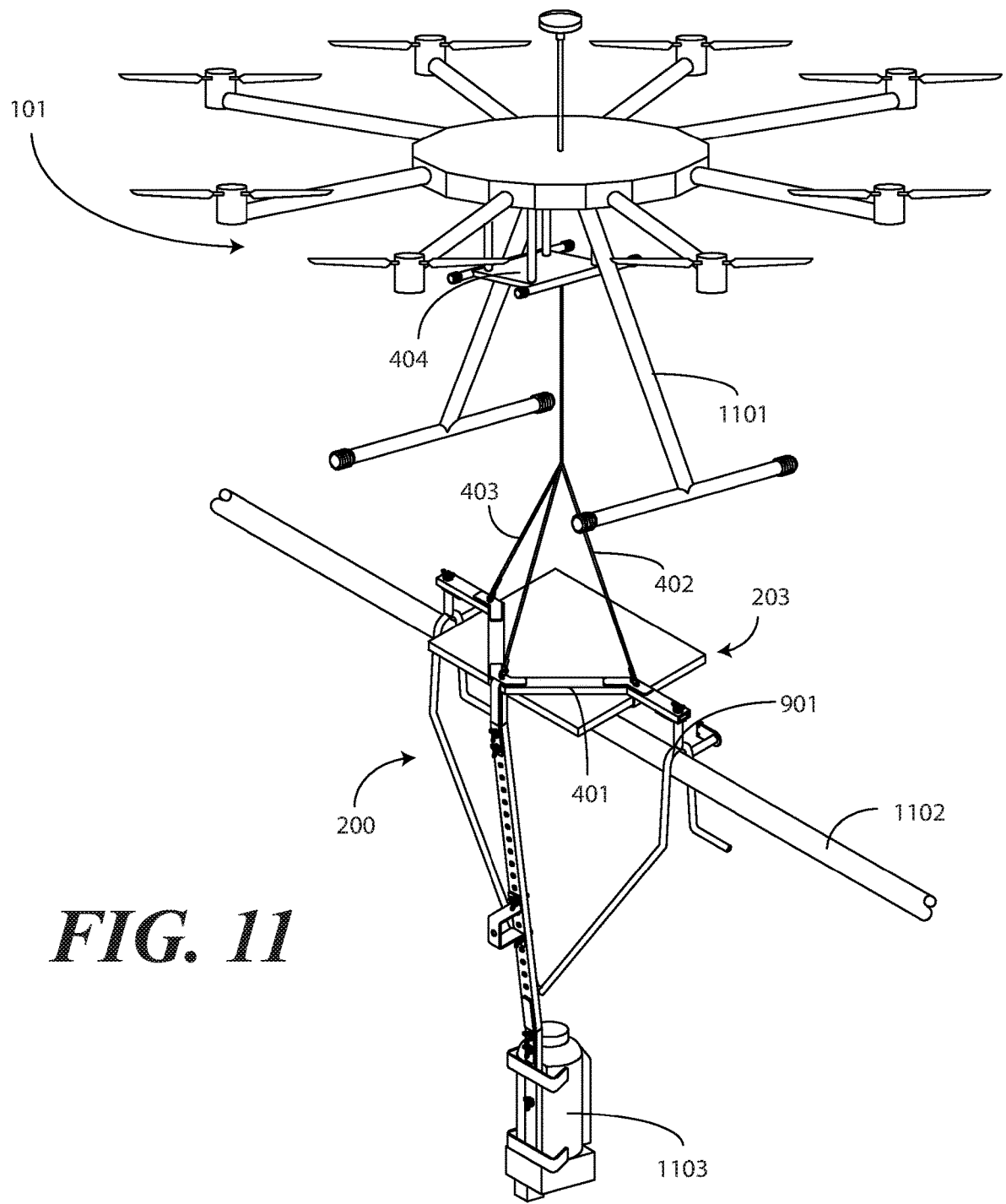
FIG. 11 illustrates a fourth perspective view of one explanatory device in accordance with one or more embodiments of the disclosure.
Figure 12:
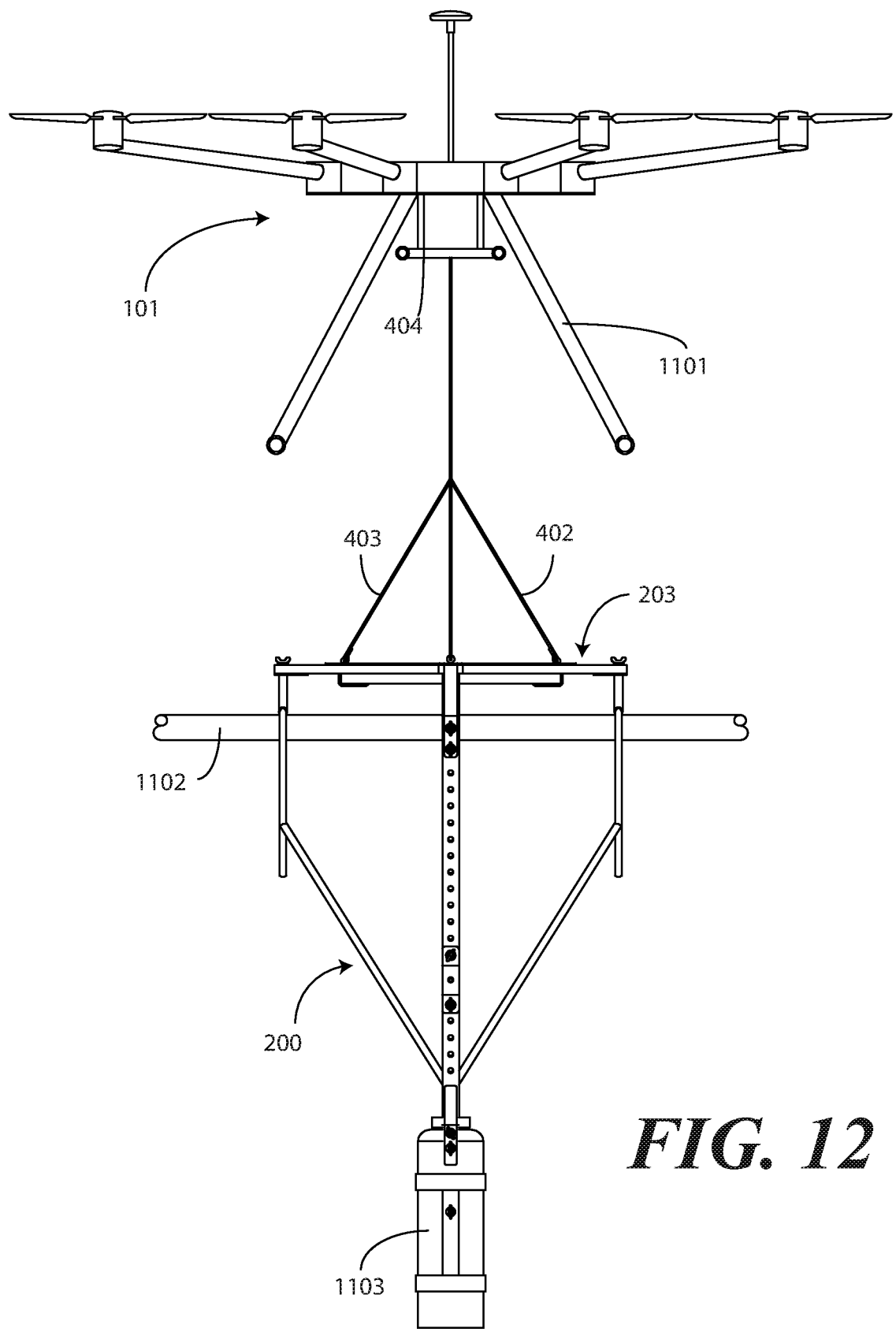
FIG. 12 illustrates a second top plan view of one explanatory device in accordance with one or more embodiments of the disclosure.
Figure 13:
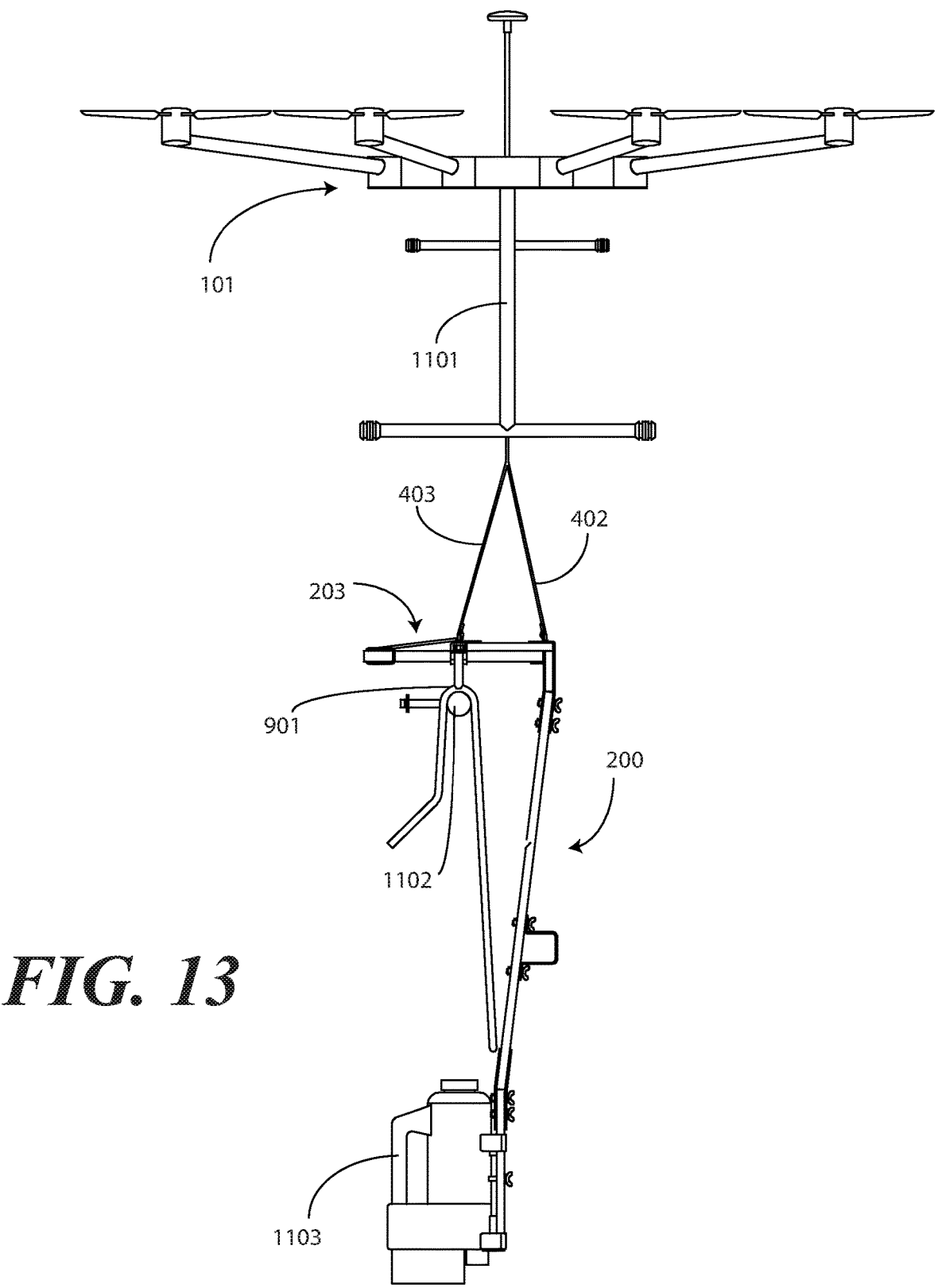
FIG. 13 illustrates a second left elevation view of one explanatory device in accordance with one or more embodiments of the disclosure.
Figure 14:
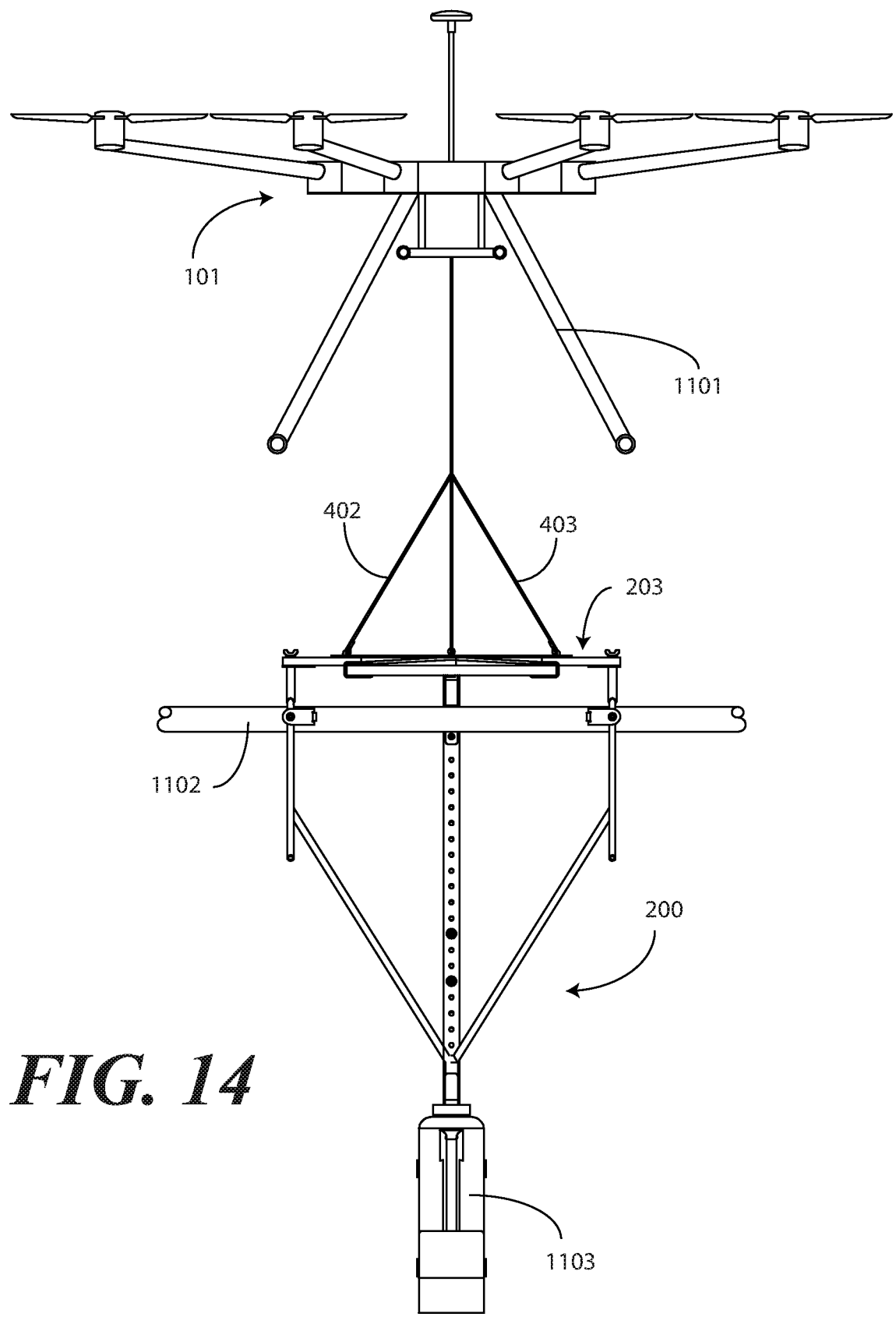
FIG. 14 illustrates a second bottom plan view of one explanatory device in accordance with one or more embodiments of the disclosure.

In one or more embodiments, as best shown in FIGS. 9-10, the cable hook weldments 211,212 each comprise an inverted, expanding U-shape, with an angled grasper coupled to one end of the expanding U-shape. Illustrating by example, as shown in FIG. 9, cable hook weldment 211 comprises a rounded portion 901, two expanding U-shape upper arms 902,903, and an angled grasper 904.

In one or more embodiments, the rounded portion 901 has a radius of about one inch. For example, the radius of the rounded portion 901 is about 0.992 inches. Extending from the rounded portion 901 in this illustrative embodiment are the two expanding U-shape upper arms 902,903. In one or more embodiments, the two expanding U-shape upper arms 902,903 have a length of about six inches. For example, the two expanding U-shape upper arms 902,903 can each have a length of about 5.957 inches in one embodiment.

In one embodiment, the two expanding U-shape upper arms 902,903 extend away from each other at an angle of between five and ten degrees. For example, in one embodiment the two expanding U-shape upper arms 902,903 extend distally away from the rounded portion 901 and separate at an angle of about 7 degrees.

In one embodiment, the angled grasper 904 has a length of between four and five inches. For example, in one embodiment the angled grasper 904 has a length of about 4.165 inches. In one embodiment, the angled grasper 904 extends from the end of the expanding U-shape upper arm 902 at an angle of between thirty-five and forty degrees. For instance, in one embodiment the angled grasper 904 extends from the end of the expanding U-shape upper arm 902 at an angle of about 38 degrees.

In one embodiment, the length 905 of the cable hook weldments 211,212 is between ten and eleven inches. For example, in one embodiment the length 905 of the cable hook weldments 211,212 is about 10.152 inches. In one or more embodiments, the cable hook weldments 211,212 are manufactured from aluminum. When in use, as shown below in FIGS. 11-14, these cable hook weldments 211,212 situate about a power line while x-ray images of the power line are being captured.

Figure 6:
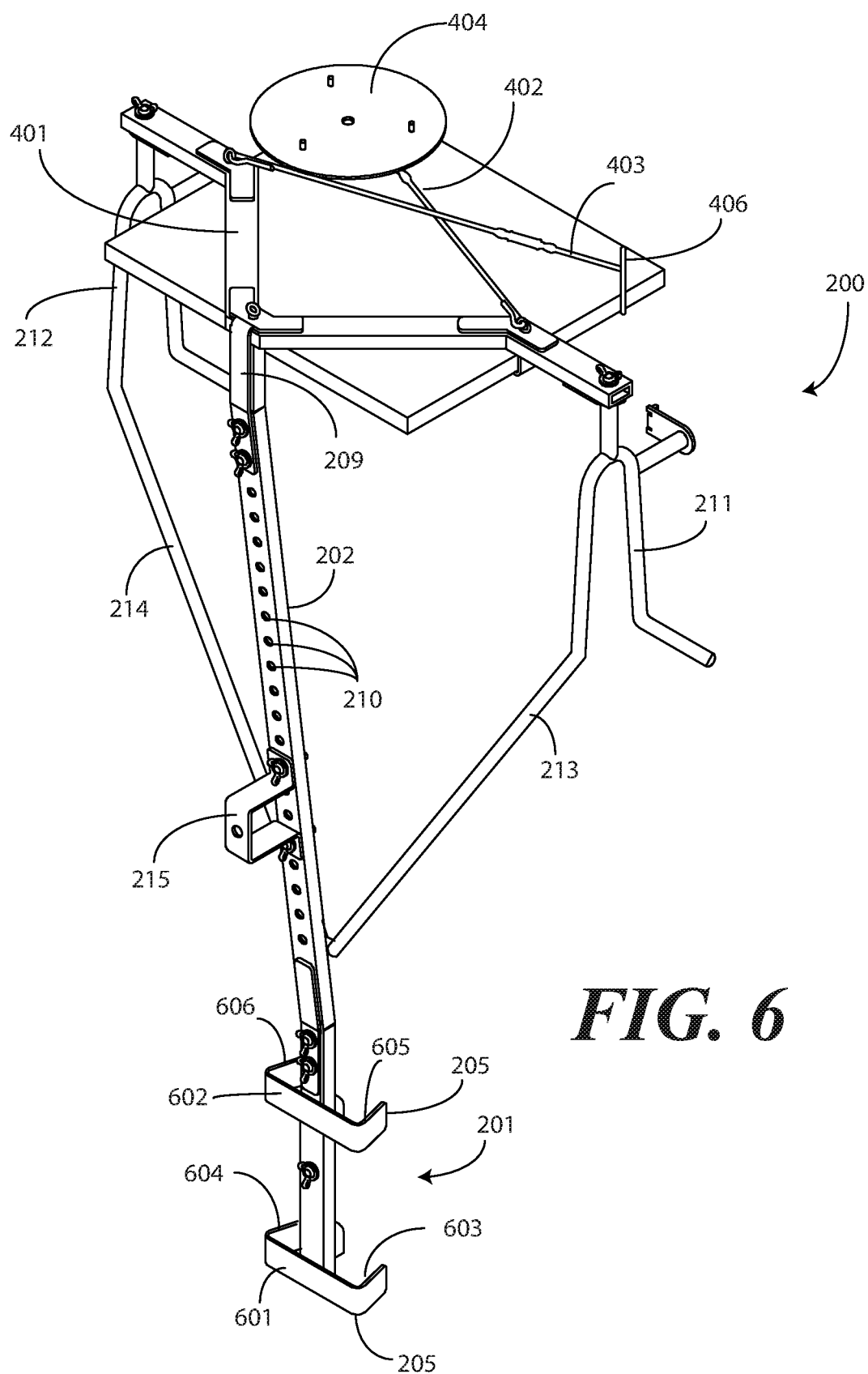
FIG. 6 illustrates a first perspective view of one explanatory device in accordance with one or more embodiments of the disclosure.
Figure 7:
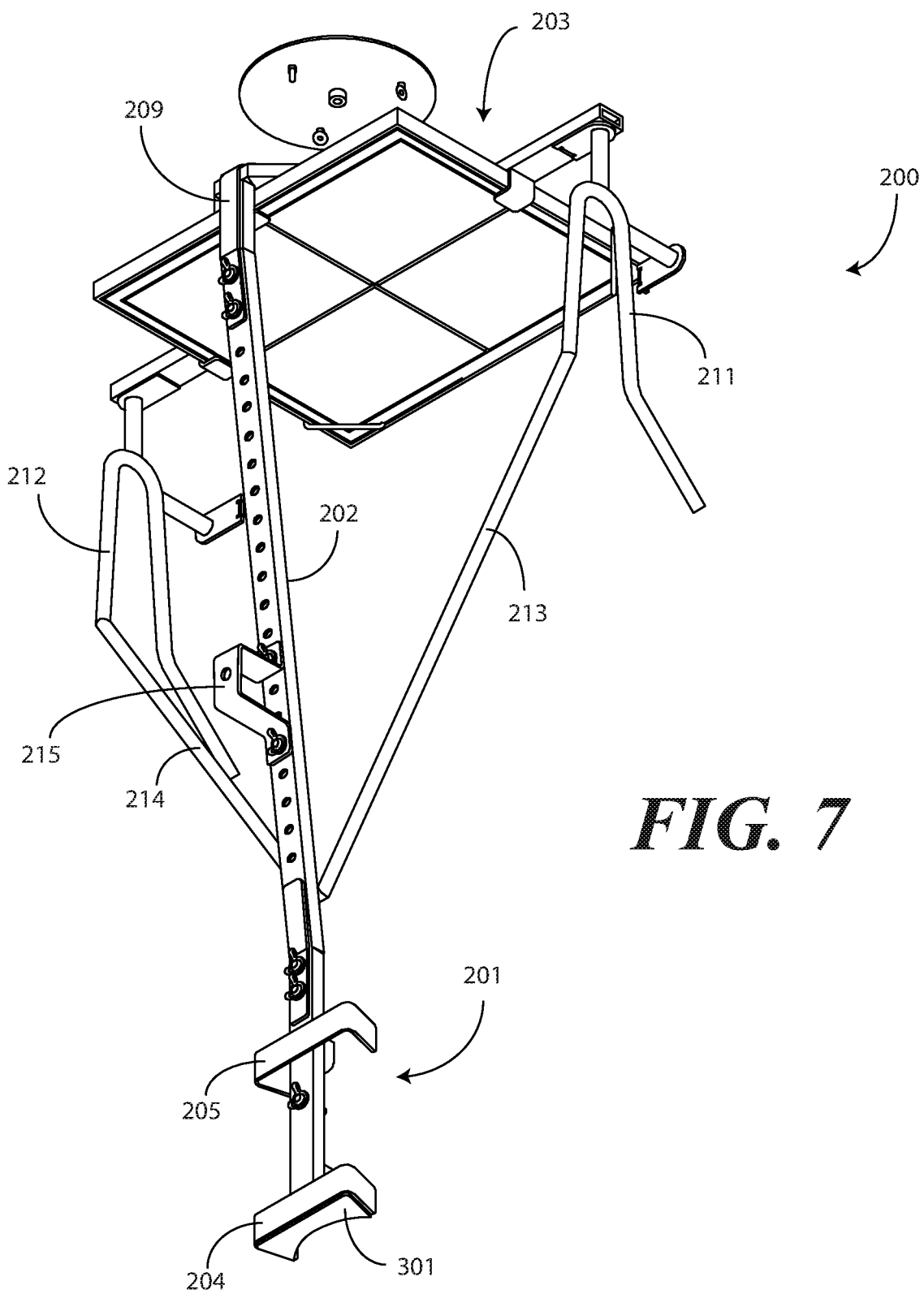
FIG. 7 illustrates a second perspective view of one explanatory device in accordance with one or more embodiments of the disclosure.
Figure 8:
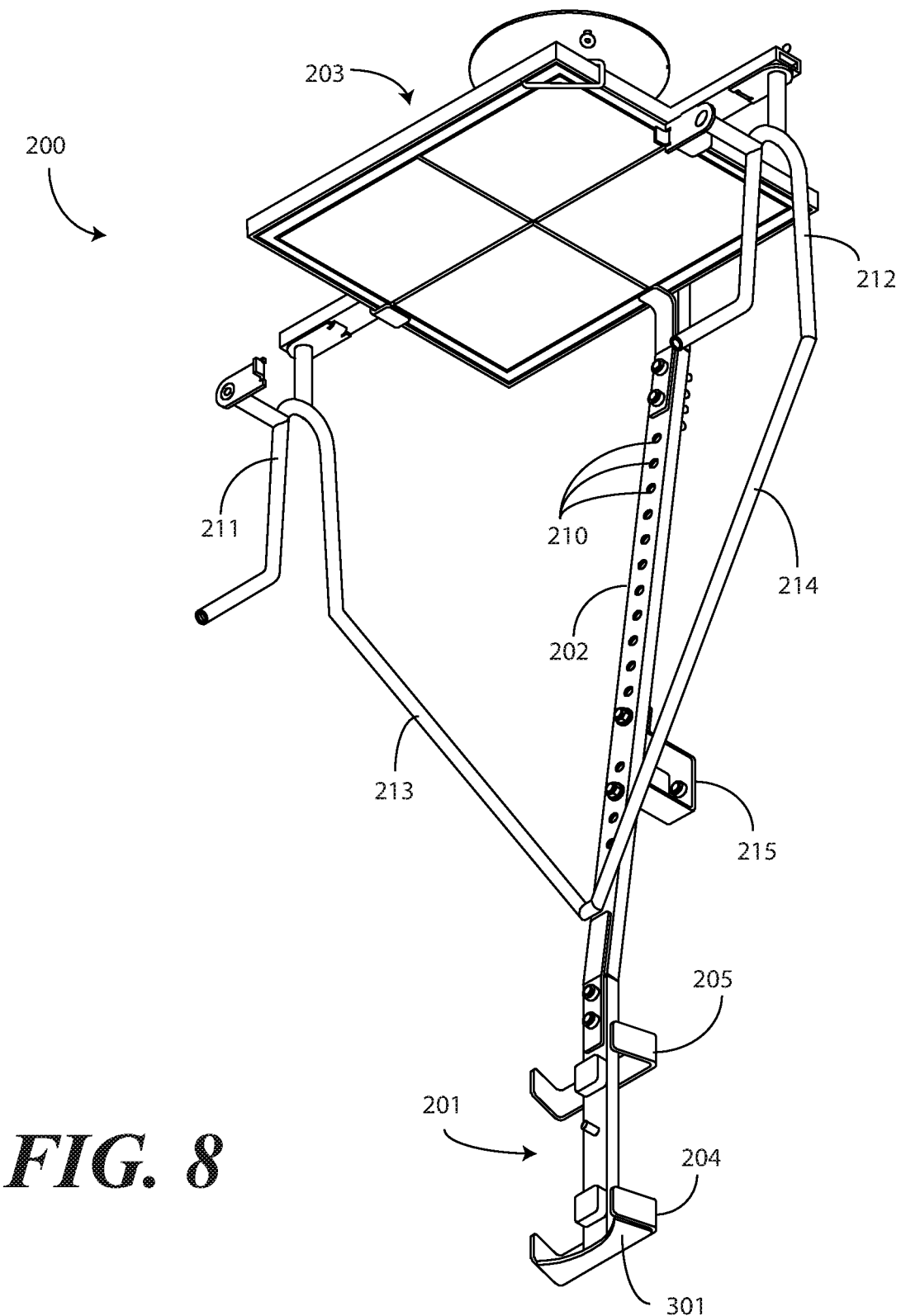
FIG. 8 illustrates a third perspective of one explanatory device in accordance with one or more embodiments of the disclosure.

As best shown in FIGS. 4 and 6, in one or more embodiments one or more cable harnesses 402,403 are coupled to, and extend distally from, the plate bracket weldment 401. In one or more embodiments, the cable harnesses 402,403 couple to a suspension plate 404. As will be shown in more detail with reference to FIGS. 11-14 below, in one or more embodiments the suspension plate 404 couples to an unmanned aerial vehicle, while the one or more cable harnesses 402,403 suspend the device 200 from the unmanned aerial vehicle.

In one or more embodiments, each of the cable harnesses 402,403 is between thirteen and fourteen inches long. For example, in one embodiment the one or more cable harnesses 402,403 coupled to the plate bracket weldment and extend distally to a T-shaped termination 405,406. In one or more embodiments, the one or more cable harnesses 402 each comprise ⅛ gauge aircraft cable.

In one embodiment, the suspension plate 404 comprises a disc having a six-inch radius. One or more apertures can be created in the suspension plate 404 so that fasteners can be added to the suspension plate 404 for coupling to the one or more cable harnesses 402,403. In one or more embodiments, these apertures are situated on a circular reference having a four-inch diameter.

In one or more embodiments, a central aperture, aligned concentrically with the suspension plate 404, is included for attachment of the suspension plate 404 to an unmanned aerial vehicle. In one or more embodiments, this central aperture has a diameter of between 0.3 inches and 0.4 inches. For example, in one embodiment the central aperture has a diameter of 0.344 inches.

In one embodiment, at the middle of the bridge weldment 202 is an attachment mount assembly 215. In one or more embodiments, the attachment mount assembly 215 extends a height from the bridge weldment 202 of between one and three inches. For example, in one or more embodiments the attachment mount assembly 215 extends above the bridge weldment 202 a distance of between 1.914 inches and 2.402 inches. In one or more embodiments, the attachment mount assembly 215 has a length of about two inches. For example, in one embodiment the length of the attachment mount assembly 215 has a length of about 1.985 inches and a width of about one inch.

In one or more embodiments, the attachment mount assembly 215 includes a central aperture. In one or more embodiments, this central aperture has a diameter of between 0.3 inches and 0.4 inches. For example, in one embodiment the central aperture has a diameter of 0.344 inches. The attachment mount assembly 215 serves as an alternate location at which the device 200 can be attached to an unmanned aerial vehicle. Thus, where it is desired to use the device 200 in a vertical orientation, the suspension plate 404 can be attached to an unmanned aerial vehicle. However, where it is desirable to use the device 200 in a horizontal orientation, the attachment mount assembly 215 can be used to attach the device 200 to an unmanned aerial vehicle.

Turning now to FIGS. 11-14, illustrated therein is the device 200 in use. As shown in these figures, the device 200 has been attached to a drone 101 using the suspension plate 404 and the one or more cable harnesses 402,403. In this illustrative embodiment, three cable harnesses are used to couple the device 200 to the suspension plate 404, and ultimately to the drone 101.

A user of the system set forth in FIGS. 11-14 may initially place the suspension plate 404 next to the underside of the drone 101 such that the suspension plate 404 is geometrically aligned so as to be perpendicular to the landing gear 1101 if the landing gear 1101 extends downward vertically from the drone 101. In the illustrative embodiment of FIGS. 11-14, the landing gear 1101 extends downwardly at an angle, so there is an angle between the suspension plate 404 and the landing gear 1101.

Next, the user may check the suspension plate 404 underneath the drone 101 for the three eyebolts. In one or more embodiments, these eyebolts include color-coded markings to help ensure that the suspension plate 404 is properly aligned. The user can then ensure the suspension plate 404 is secured to the drone 101 via the eyebolts.

The user may next unhook the one or more cable harnesses 402,403 from the suspension plate 404 and place any excess tether length of the one or more cable harnesses 402,403 underneath the landing gear 1101. As with the eyebolts, the connection points at which the one or more cable harnesses 402,403 attach to the suspension plate 404 may be color-coded to assist with proper assembly.

The user can then ensure that the suspension plate 404 is seated correctly and that the cable harnesses 402,403 run from the plate bracket weldment 401, or eyelets coupled to the plate bracket weldment 401, to the underside of the suspension plate 404. In one or more embodiments, the cable harnesses 402,403 may run about the edges of the suspension plate 404 to side eyelets. The user may then check other couplings, such as any tripod mount and/or screws underneath the drone 101.

When maneuvering the drone 101 with the device 200 attached, all aircraft movements should be slow and precise to reduce twisting and tangling of the one or more cable harnesses 402,403. Using visual cues from the pilot and the image capture device (108) of the drone 101, the user causes the drone 101 to climb to a safe altitude free and clear of the cable 1102 or power line to be x-rayed.

The user then positions the drone 101 such that the cable hook weldments 211,212 are directly above the cable 1102 or power lone to be x-rayed. Once the cable hook weldments 211,212 are situated above the cable 1102, the user causes the drone 101 to descend, thus bringing the cable 1102 into the expanding U-shapes defined by the cable hook weldments 211,212, with the cable 1102 ultimately resting against the rounded portions 901 into the cable 1102 or power line and resting the rounded portions 901 of the cable hook weldments 211,212.

Guidance of the cable 1102 into the cable hook weldments 211,212 is facilitated by the unique shape of the cable hook weldments 211,2012. Recall from above that in one or more embodiments, each cable hook weldment 211,212 comprises an inverted, expanding U-shape, with an angled grasper coupled to one end of the expanding U-shape. The angled grasper provides a wide entry point for the cable 1102, thereby making precision flight of the drone 101 less critical. The wide entry point also helps to ensure that the cable 1102 will not be damaged during inspection.

Once the cable 1102 is within the wide entry point defined by the angled grasper, the user causes the drone 101 to descend slowly. The expanding U-shape upper arms cause the cable 1102 to feed toward the rounded portion 901. Once the drone 101 descends sufficiently, the cable 1102 will rest against the rounded portions 901 of the cable hook weldments 211,212 as shown in FIGS. 11-14. X-ray images of the cable 1102 can then be captured when the x-ray imager 1103 excites the film positioned on the x-ray plate 203.

During this process, for enhanced safety, the following verbal queues can then optionally be spoken:
Pilot Verbal queue: IN Position
x-ray Operator: EXPOSING (X-ray Triggering)
X-ray Operator: PROCESSING (X-ray image plate processing image)
x-ray Operator: COMPLETE (Verbal and Visual queue of thumbs up)
Pilot: Moving After capturing the desired x-ray imagery, the pilot then starts maneuvering drone 101 up and away from the cable 1102, thereby releasing the cable 1102 from the cable hook weldments 211,212. The pilot will slightly slide the aircraft to the rear just enough to allow the device 200 to fall back once the cable 1102 is fully released from the cable hook weldments 211,212. The device 200 should then be free and clear of the cable 1102 to move on to the next measurement.

Figure 15:
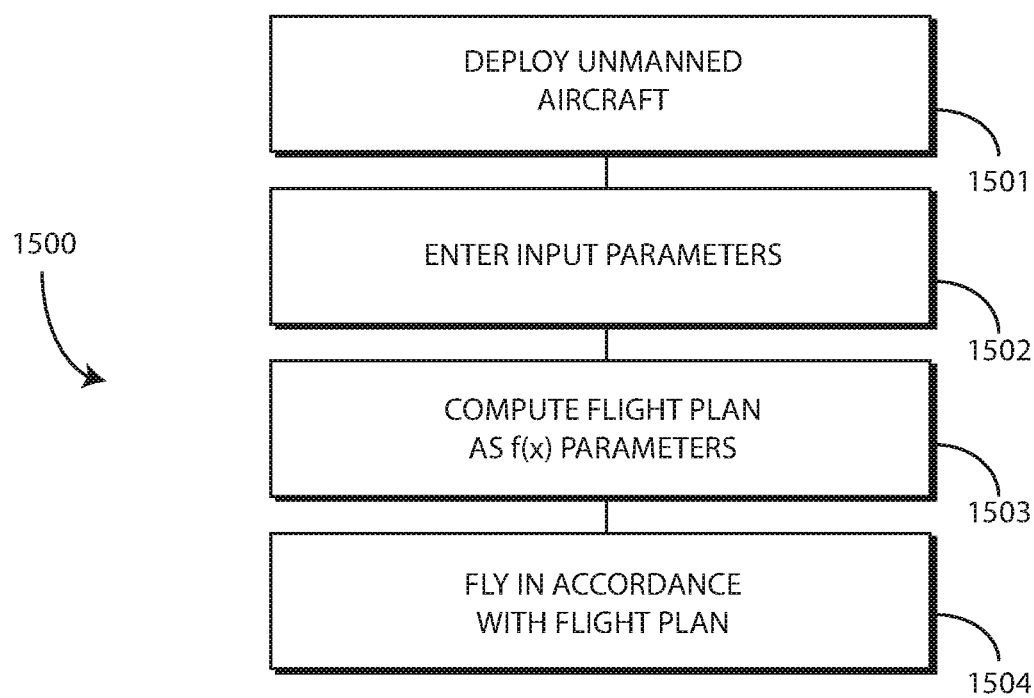
FIG. 15 illustrates one explanatory method in accordance with one or more embodiments of the disclosure.

A summary of this method is found in FIG. 15. Turning now to FIG. 15, in one embodiment at step 1501 the method 1500 comprises attaching the device (200) to the drone (101). At step 1502, the method 1500 comprises attaching an x-ray imager (1103) to the unit bracket weldment (201). At step 1503, the method 1500 includes flying the drone (101) as described above with reference to FIGS. 11-14 to situate a cable (1102) or power line within the cable hook weldments (211,212). At step 1504, the method 1500 includes capturing one or more x-ray images of the cable 1102 or power line.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A device, comprising:
a unit bracket weldment;
a bridge weldment extending from the unit bracket weldment to a plate bracket assembly;
an x-ray plate extending distally from the plate bracket assembly; and
cable hook weldments disposed to either side of the x-ray plate.

2. The device of claim 1, wherein each cable hook weldment defines an inverted, expanding U-shape.

3. The device of claim 2, wherein the each cable hook weldment comprises an angled grasper coupled to one end of the inverted, expanding U-shape.

4. The device of claim 3, wherein the each cable hook weldment comprises two expanding U-shape upper arms extending from a rounded portion.

5. The device of claim 4, wherein the rounded portion has a radius of about one inch.

6. The device of claim 4, wherein the two expanding U-shape upper arms have a length of about six inches.

7. The device of claim 6, wherein the two expanding U-shape upper arms extend away from each other at an angle of between five and ten degrees.

8. The device of claim 4, wherein the angled grasper has a length of between four and five inches.

9. The device of claim 8, wherein the angled grasper extends from an end of one expanding U-shape upper arm at an angle of between thirty-five and forty degrees.

10. The device of claim 9, wherein the angle is about thirty-eight degrees.

11. The device of claim 1, further comprising an x-ray imager coupled to the device.

12. A device, comprising:
a unit bracket weldment;
a bridge weldment extending from the unit bracket weldment to an x-ray plate extending distally from the bridge weldment; and
cable hook weldments disposed to either side of the x-ray plate, wherein the cable hook weldments are coupled to the bridge weldment with one or more suspension arms.

13. The device of claim 12, further comprising a plate bracket weldment coupled to the x-ray plate.

14. The device of claim 13, the plate bracket weldment defining a V-shaped section having extension members extending from a top of the V-shaped section.

15. The device of claim 14, further comprising one or more cable harnesses extending distally from the plate bracket weldment.

16. The device of claim 15, further comprising a suspension plate coupled to a distal end of the one or more cable harnesses.

17. The device of claim 16, further comprising a drone coupled to the suspension plate.

18. The device of claim 15, further comprising an attachment mount assembly coupled to the bridge weldment.

19. A method, comprising:
attaching a device to a drone;
attaching an x-ray imager to a unit bracket weldment of the device; and
flying the drone to situate a power line within cable hook weldments of the device.

20. The method of claim 19, further comprising capturing one or more x-ray images of the power line.

* * * * *